United States Patent
Staring et al.

(10) Patent No.: US 7,587,603 B2
(45) Date of Patent: *Sep. 8, 2009

(54) PROTECTING CONTENT FROM ILLICIT REPRODUCTION BY PROOF OF EXISTENCE OF A COMPLETE DATA SET VIA SELF-REFERENCING SECTIONS

(75) Inventors: Antonius A. M. Staring, Eindhoven (NL); Michael A. Epstein, Spring Valley, NY (US); Martin Rosner, Hasting-on-Hudson, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/746,277

(22) Filed: May 9, 2007

(65) Prior Publication Data

US 2007/0206793 A1   Sep. 6, 2007

Related U.S. Application Data

(63) Continuation of application No. 09/536,944, filed on Mar. 28, 2000, now Pat. No. 7,228,425.

(60) Provisional application No. 60/180,838, filed on Feb. 7, 2000.

(51) Int. Cl.
*H04L 9/32* (2006.01)
*H04L 29/06* (2006.01)
*H04L 9/00* (2006.01)
*G06F 21/00* (2006.01)
*G06F 12/14* (2006.01)
*G06F 7/04* (2006.01)
*H04N 7/167* (2006.01)

(52) U.S. Cl. .............. 713/176; 713/165; 713/182; 713/189; 726/26; 726/27; 726/30; 380/200; 380/201; 380/202; 380/232; 380/241; 705/51; 705/57; 705/59

(58) Field of Classification Search ............ 713/176
See application file for complete search history.

(56) References Cited

U.S. PATENT DOCUMENTS 5,341,429 A    8/1994   Stringer et al.

(Continued)

FOREIGN PATENT DOCUMENTS

EP           644474 A1 *  3/1995

(Continued)

OTHER PUBLICATIONS

Acken, John;"How Watermarking Adds Value to Digital Content", Jul. 1998, Communications of ACM, pp. 74-77.

(Continued)

*Primary Examiner*—Ayaz R Sheikh
*Assistant Examiner*—Aravind K Moorthy

(57) ABSTRACT

Data items are selected for inclusion in a data set so as to discourage a transmission of the entire set. Each data item includes section(s) which constitute(s) the complete data set. Each section contains a watermark that includes an identifier of the section, and an identifier of the data set. The identifier of the section may be the address of the section, and the identifier of the data set may be the serial number and an indicator of the total size of the data set. The presence of the data set is confirmed by checking the watermarks of randomly selected sections to verify that the original section that formed the data set is present. If a section is discovered to be missing or altered, subsequent processing of data items of the data set is prevented. The identifiers may be stored as a combination of robust and fragile watermarks.

17 Claims, 4 Drawing Sheets

U.S. PATENT DOCUMENTS

| | | | |
|---|---|---|---|
| 5,448,307 A | 9/1995 | Gelissen et al. | |
| 5,473,687 A | 12/1995 | Lipscomb et al. | |
| 5,625,693 A | 4/1997 | Rohatgi et al. | |
| 5,809,006 A | 9/1998 | Davis et al. | |
| 5,905,800 A | 5/1999 | Moskowitz et al. | |
| 5,930,209 A | 7/1999 | Spitzenberger et al. | |
| 6,064,764 A | 5/2000 | Bhaskaran et al. | |
| 6,226,387 B1 | 5/2001 | Tewfik et al. | |
| 6,460,046 B1 | 10/2002 | Meek | |
| 6,490,683 B1 | 12/2002 | Yamada et al. | |
| 6,865,676 B1 | 3/2005 | Staring et al. | |
| 6,944,771 B2 | 9/2005 | Epstein | |
| 6,986,048 B1 | 1/2006 | Epstein et al. | |
| 7,082,413 B2 * | 7/2006 | Bell et al. | 705/51 |
| 7,228,425 B1 * | 6/2007 | Staring et al. | 713/176 |
| 7,412,601 B2 * | 8/2008 | Shibata et al. | 713/161 |
| 7,486,790 B1 * | 2/2009 | Selinfreund et al. | 380/201 |
| 7,503,077 B2 * | 3/2009 | Asano | 726/32 |
| 2002/0004884 A1 * | 1/2002 | Yamakawa et al. | 711/112 |
| 2005/0226421 A1 | 10/2005 | Briancon et al. | |
| 2006/0101269 A1 | 5/2006 | Moskowitz et al. | |
| 2006/0130107 A1 | 6/2006 | Gonder et al. | |
| 2006/0184807 A1 | 8/2006 | Kocher et al. | |
| 2009/0039156 A1 * | 2/2009 | Brandli et al. | 235/382 |
| 2009/0055510 A1 * | 2/2009 | Svendsen | 709/217 |
| 2009/0063856 A1 * | 3/2009 | Dunn et al. | 713/160 |
| 2009/0086601 A1 * | 4/2009 | McClellan et al. | 369/94 |
| 2009/0092279 A1 * | 4/2009 | Tabata et al. | 382/100 |

FOREIGN PATENT DOCUMENTS

| | | | |
|---|---|---|---|
| EP | 0840513 A2 | | 5/1998 |
| EP | 0890948 A1 | | 1/1999 |
| EP | 0903943 A2 | | 3/1999 |
| EP | 0908881 A2 | | 4/1999 |
| EP | 0908881 A3 | | 4/1999 |
| EP | 1069567 A1 | * | 1/2001 |
| EP | 1444558 B1 | | 1/2006 |
| EP | 1628462 A2 | * | 2/2006 |
| WO | 9833325 A2 | | 7/1998 |
| WO | 9917281 | | 4/1999 |
| WO | 9917281 A1 | | 4/1999 |
| WO | 9945704 A2 | | 9/1999 |
| WO | 9945705 A2 | | 9/1999 |
| WO | 0039953 A1 | | 7/2000 |
| WO | 0157869 A2 | | 8/2001 |
| WO | 0159705 A2 | | 8/2001 |
| WO | 03003175 A1 | | 1/2003 |
| WO | 03029935 A2 | | 4/2003 |
| WO | 03041072 A1 | | 5/2003 |
| WO | 03075272 A2 | | 9/2003 |
| WO | 2005106870 A1 | | 11/2005 |
| WO | 2006064473 A1 | | 6/2006 |

OTHER PUBLICATIONS

Zhong et al.; A New Fragile Watermarking Technique for Image Authentication, 2002, IEEE, pp. 792-795.

Acken, John, "How Watermarking adds value to digital content", Jul. 1998, Communications of ACM, pp. 674-677.

Zhong et al, "A new fragile watermarking technique for image authentication", 2002, IEEE, pp. 792-795.

Maes et al, "Exploiting shift invariance to obtain a high payload in digital image watermarking", 1999, IEEE, pp. 7-12.

* cited by examiner

PROTECTING CONTENT FROM ILLICIT REPRODUCTION BY PROOF OF EXISTENCE OF A COMPLETE DATA SET VIA SELF-REFERENCING SECTIONS

CROSS REFERENCE TO RELATED APPLICATIONS

This application claims the benefit of U.S. Provisional Application No. 60/180,838 filed Feb. 7, 2000, and is a continuation of prior application Ser. No. 09/536,944 filed Mar. 28, 2000, now U.S. Pat. No. 7,228,425.

BACKGROUND OF THE INVENTION

1. Field of the Invention

This invention relates primarily to the field of consumer electronics, and in particular to the protection of copy-protected content material.

2. Description of Related Art

The illicit distribution of copyright material deprives the holder of the copyright legitimate royalties for this material, and could provide the supplier of this illicitly distributed material with gains that encourage continued illicit distributions. In light of the ease of information transfer provided by the Internet, content material that is intended to be copy-protected, such as artistic renderings or other material having limited distribution rights, are susceptible to wide-scale illicit distribution. The MP3 format for storing and transmitting compressed audio files has made the wide-scale distribution of audio recordings feasible, because a 30 or 40 megabyte digital audio recording of a song can be compressed into a 3 or 4 megabyte MP3 file. Using a typical 56 kbps dial-up connection to the Internet, this MP3 file can be downloaded to a user's computer in a few minutes. Thus, a malicious party could read songs from an original and legitimate CD, encode the songs into MP3 format, and place the MP3 encoded song on the Internet for wide-scale illegitimate distribution. Alternatively, the malicious party could provide a direct dial-in service for downloading the MP3 encoded song. The illicit copy of the MP3 encoded song can be subsequently rendered by software or hardware devices, or can be decompressed and stored onto a recordable CD for playback on a conventional CD player.

A number of schemes have been proposed for limiting the reproduction of copy-protected content material. The Secure Digital Music Initiative (SDMI) and others advocate the use of "digital watermarks" to identify authorized content material. EP 0981901 "Embedding auxiliary data in a signal" issued 1 Mar. 2000 to Antonius A. C. M. Kalker, discloses a technique for watermarking electronic material, and is incorporated by reference herein. As in its paper watermark counterpart, a digital watermark is embedded in the content material so as to be detectable, but unobtrusive. An audio playback of a digital music recording containing a watermark, for example, will be substantially indistinguishable from a playback of the same recording without the watermark. A watermark detection device, however, is able to distinguish these two recordings based on the presence or absence of the watermark. Because some content material may not be copy-protected and hence may not contain a watermark, the absence of a watermark cannot be used to distinguish legitimate from illegitimate material. On the contrary, the absence of a watermark is indicative of content material that can be legitimately copied freely.

Other copy protection schemes are also available. For example, European patent EP0906700, "Method and system for transferring content information and supplemental information related thereto", issued 7 Apr. 1999 to Johan P. M. G., presents a technique for the protection of copyright material via the use of a watermark "ticket" that controls the number of times the protected material may be rendered, and is incorporated by reference herein.

An accurate reproduction of watermarked material will cause the watermark to be reproduced in the copy of the watermarked material. An inaccurate, or lossy reproduction of watermarked material, however, may not provide a reproduction of the watermark in the lossy copy of the material. A number of protection schemes, including those of the SDMI, have taken advantage of this characteristic of lossy reproduction to distinguish legitimate material from illegitimate material, based on the presence or absence of an appropriate watermark. In the SDMI scenario, two types of watermarks are defined: "robust" watermarks, and "fragile" watermarks. A robust watermark is one that is expected to survive a lossy reproduction that is designed to retain a substantial portion of the original content material, such as an MP3 encoding of an audio recording. That is, if the reproduction retains sufficient information to allow a reasonable rendering of the original recording, the robust watermark will also be retained. A fragile watermark, on the other hand, is one that is expected to be corrupted by a lossy reproduction or other illicit tampering.

In the SDMI scheme, the presence of a robust watermark indicates that the content material is copy protected, and the absence or corruption of a corresponding fragile watermark when a robust watermark is present indicates that the copy protected material has been tampered with in some manner. An SDMI compliant device is configured to refuse to render watermarked material with a corrupted watermark, or with a detected robust watermark but an absent fragile watermark, except if the corruption or absence of the watermark is justified by an "SDMI-certified" process, such as an SDMI compression of copy protected material for use on a portable player. For ease of reference and understanding, the term "render" is used herein to include any processing or transferring of the content material, such as playing, recording, converting, validating, storing, loading, and the like. This scheme serves to limit the distribution of content material via MP3 or other compression techniques, but does not affect the distribution of counterfeit unaltered (uncompressed) reproductions of content material. This limited protection is deemed commercially viable, because the cost and inconvenience of downloading an extremely large file to obtain a song will tend to discourage the theft of uncompressed content material.

BRIEF SUMMARY OF THE INVENTION

It is an object of this invention to extend the protection of copy-protected material to include the protection of uncompressed content material.

This object and others are achieved by selecting a sufficient number of data items for inclusion in a data set so as to discourage a transmission of the entire set over a limited bandwidth communications path, such as the Internet. Each data item comprises one or more sections, and the totality of sections constitute the complete data set. Each section of the data set contains a watermark that includes an identifier of the section, and an identifier of the data set. In a preferred embodiment, the identifier of the section is the address of the section, and the identifier of the data set is a serial number and an indicator of the total size of the data set. The presence of the data set is confirmed by checking the watermarks of randomly selected sections to verify that the original section that formed the data set is present. If a section is discovered to be missing or altered, subsequent processing of data items of the data set is prevented. In a preferred embodiment, the identifiers are stored as a combination of robust and fragile watermarks.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
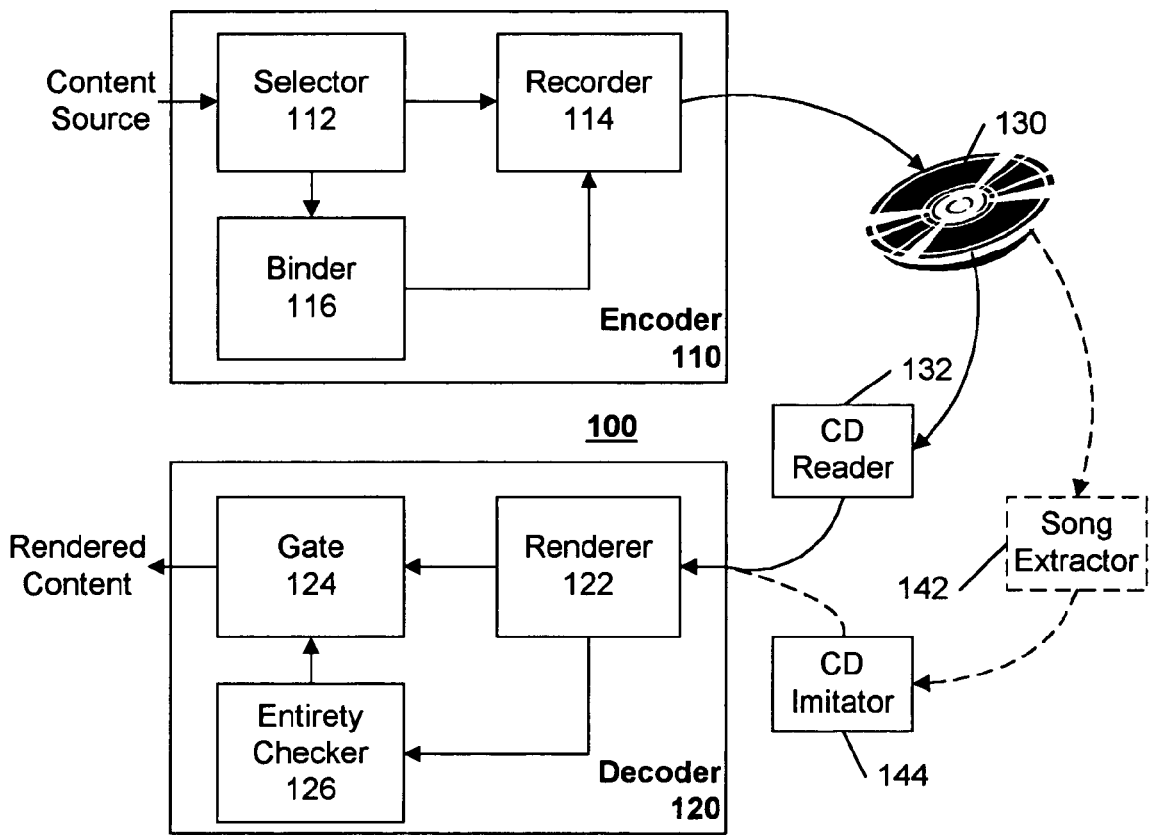
FIG. 1 illustrates an example system for protecting copy-protected content material in accordance with this invention.

For ease of understanding, the invention is presented herein in the context of digitally recorded songs. As will be evident to one of ordinary skill in the art, the invention is applicable to any recorded information that is expected to be transmitted via a limited bandwidth communications path. For example, the individual content material items may be data records in a larger database, rather than songs of an album.

The theft of an item can be discouraged by making the theft more time consuming or inconvenient than the worth of the stolen item. For example, a bolted-down safe is often used to protect small valuables, because the effort required to steal the safe will typically exceed the gain that can be expected by stealing the safe. Copending U.S. patent application "Protecting Content from Illicit Reproduction by Proof of Existence of a Complete Data Set", U.S. Ser. No. 09/537,815, filed Mar. 28, 2000 for Michael A. Epstein, teaches selecting and binding data items to a data set that is sized sufficiently large so as to discourage a transmission of the data set via a bandwidth limited communications system, such as the Internet, and is incorporated by reference herein. This copending application teaches a binding of the data items in the data set by creating a watermark that contains a data-set-entirety parameter and embedding this watermark into each section of each data item. The copending application also teaches including a section-specific parameter (a random number assigned to each section) in the watermark. The referenced copending application teaches the use of "out of band data" to contain the entirety parameter, or information that can be used to determine the entirety parameter. The section watermarks are compared to this entirety parameter to assure that they are the same sections that were used to create the data set and this entirety parameter. To minimize the likelihood of forgery, the entirety parameter is based on a hash of a composite of section-specific identifiers. The referenced copending application also teaches the use of digitally signed certificates and other techniques that rely on cryptographic techniques, such as hashing and the like.

Copending U.S. patent application "Protecting Content from Illicit Reproduction by Proof of Existence of a Complete Data Set via a Linked List", U.S. Ser. No. 09/537,079, filed Mar. 28, 2000 for Antonius A. M. Staring and Michael A. Epstein, teaches a self-referential data set that facilitates the determination of whether the entirety of the data set is present, without the use of out of band data and without the use of cryptographic functions, such as a hash function. This copending application creates a linked list of sections of a data set, encodes the link address as a watermark of each section, and verifies the presence of the entirety of the data set by verifying the presence of the linked-to sections of some or all of the sections of the data set.

In this invention, each section of a data set is uniquely identified and this section identifier is associated with each section in a secure manner. To assure that a collection of sections are all from the same data set, an identifier of the data set is also securely encoded with each section. Preferably, the section identifier and the data set identifier are encoded as a watermark that is embedded in each section, preferably as a combination of robust and fragile watermarks. Using exhaustive or random sampling, the presence of the entirety of the data set is determined, either absolutely or with statistical certainty. If the entirety of the data set is not present, subsequent processing of the data items of the data set is terminated. In the context of digital audio recordings, a compliant playback or recording device is configured to refuse to render an individual song in the absence of the entire contents of the CD. The time required to download an entire album on a CD in uncompressed digital form, even at DSL and cable modem speeds, can be expected to be greater than an hour, depending upon network loading and other factors. Thus, by requiring that the entire contents of the CD be present, at a download "cost" of over an hour, the likelihood of a theft of a song via a wide-scale distribution on the Internet is substantially reduced.

FIG. 1 illustrates an example block diagram of a protection system 100 in accordance with this invention. The protection system 100 comprises an encoder 110 that encodes content material onto a medium 130, and a decoder 120 that renders the content material from the medium 130. The encoder 110 includes a selector 112 that selects content material from a source, a binder 116 that builds an entirety verification structure, and a recorder 114 that records the content material with the entirety verification structure onto the medium 130. The selector 112, for example, may be configured to select content information corresponding to songs that are being compiled into an album. Each selected content material item is termed a data item; each data item includes one or more sections of data comprising the data item. The binder 116 is configured to bind each section to the data set, to facilitate a determination of whether the entirety of the data set is present when a data item of the data set is presented for rendering, for example, when a selected song is presented to a rendering device for playback. The recorder 114 appropriately formats, encodes, and stores the information on the medium 130, using techniques common in the art.

In accordance with this invention, the selector 112 selects data items to be added to the data set until the size of the data set is deemed large enough to discourage a subsequent transmission of the data set via a limited bandwidth communications channel. This "discouraging size" is a subjective value, and will depend upon the assumed available communications bandwidth, the loss incurred by the transmission, and so on.

Other criteria may also be used to determine whether to add additional data items to the data set. For example, if the data items correspond to songs of an existing album collection, all of the songs will typically be added to the data set, regardless of whether the size of the data set has exceeded the determined discouraging size. If all of the songs of the album collection have been selected, and the discouraging size criterion has not yet been reached, other data items are selected to accumulate the required discouraging size. For example, data items comprising random data bits may be added to the data set to increase its size. These random bits will typically be stored as out of band data, CD-ROM data, and the like, to prevent it from being rendered as audible sounds by a conventional CD player. Alternatively, the data items may comprise other sample songs that are provided to encourage the sale of other albums, or images and video sections related to the recorded content material. Similarly, promotional material, such as Internet access subscription programs may also be included in the recorded information on the recorded medium. These and other means of adding size to a data set will be evident to one of ordinary skill in the art in view of this invention. In accordance with this invention, the encoder 110 includes a binder 116 that creates a unique identifier for each section, and an identifier for the entirety of the data set. In a preferred embodiment, the identifier of each section is the address that is used for accessing the particular section. The data set identifier can be any somewhat-unique identifier that reduces the likelihood of different data sets having the same identifier, thereby reducing the likelihood of an illicit substitution of sections from different data sets. In a preferred embodiment, for example, the data set identifier includes a 64 bit random number, and a parameter that can be used to determine the total size of the data set. The binder 116 communicates the data set identifier and the unique identifier of each section to the recorder 114 for recording onto the medium 130.

Preferably, the recorder records the data set identifier and the unique identifier of each section as one or more watermarks that are embedded in each section. In a preferred embodiment, the section identifier and data set identifier are encoded as combination of a robust watermark and a fragile watermark. In this manner, a removal of the robust watermark will cause damage to the section, and a modification of the section will cause damage to the fragile watermark. Preferably, the data set identifier is encoded as a fragile watermark, and the section identifier is encoded as a robust watermark, because robust watermarks consume more resources, and the section identifier typically requires fewer bits than the data set identifier. In an alternative preferred embodiment, the aforementioned parameter that facilitates a determination of the size of the data set is encoded as a robust watermark and the remainder of the data set identifier and section identifier are encoded as fragile watermarks. Alternative combinations of robust and fragile watermarks may also be used, as would be evident to one of ordinary skill in the art in view of this invention. For example, the total size of the data set may form the bulk of the data set identifier. Or, the data set identifier or total size of the data set may be encoded as a robust watermark that extends across multiple sections. Other watermarks may also be used in addition to, or in combination with, these watermarks, including for example, watermark "tickets" that limit the number of times a data set may be copied. Such a watermark ticket may form the aforementioned data set identifier. Copending U.S. patent application "Copy Protection by Ticket Encryption", Ser. No. 09/333,628, filed Jun. 15, 1999 for Michael Epstein, presents techniques for the protection of copyright material, and is incorporated by reference herein.

The decoder 120 in accordance with this invention comprises a renderer 122 and a gate 124 that is controlled by an entirety checker 126. The renderer 122 is configured to retrieve information from a medium reading device, such as a CD reader 132. As is common in the art, the renderer 122 retrieves the information by specifying a location index, and in response, the reader 132 provides the data located at the specified location index on the medium 130. In a typical memory structure comprising tracks and sections, a section of data is retrieved by specifying a section address.

The dotted lines of FIG. 1 illustrate an example song extractor 142 that extracts a song from the medium 130 and communicates it to an example CD imitator 144, representative of a possible illicit download of the song via the Internet. The CD imitator 144 represents, for example, a software program that provides information in response to a conventional CD-read command. Alternatively, the information received from the song extractor can be written to a CD medium, and provided to the conventional CD reader 132. As noted above, the song extractor 142 is likely to be used because the transmission of the entirety of the contents of the medium 130 is assumed to be discouraged by the purposeful large size of the contents of the medium 130.

In accordance with this invention, the entirety checker 126 is configured to obtain data from the medium 130, typically via the renderer 122, to determine whether the entire data set is present. The renderer 122 is configured to determine the watermark associated with each section of data that is read from the medium 130. The entirety checker 126 uses the watermarks to determine whether the entirety of the data set is available to the renderer 122, as discussed below.

Figure 2:
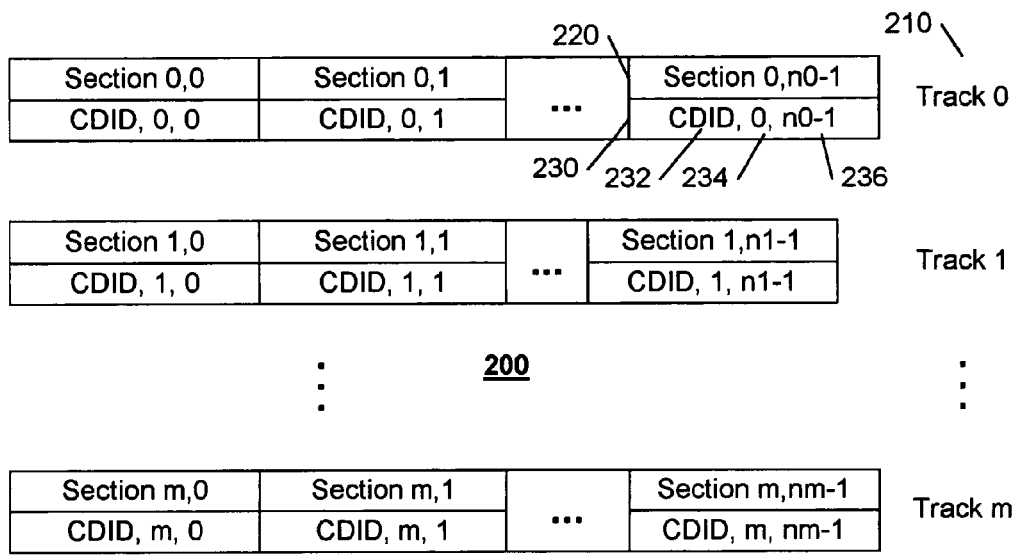
FIG. 2 illustrates an example data structure that facilitates a determination of the presence of an entirety of a data set in accordance with this invention.
Figure 3:
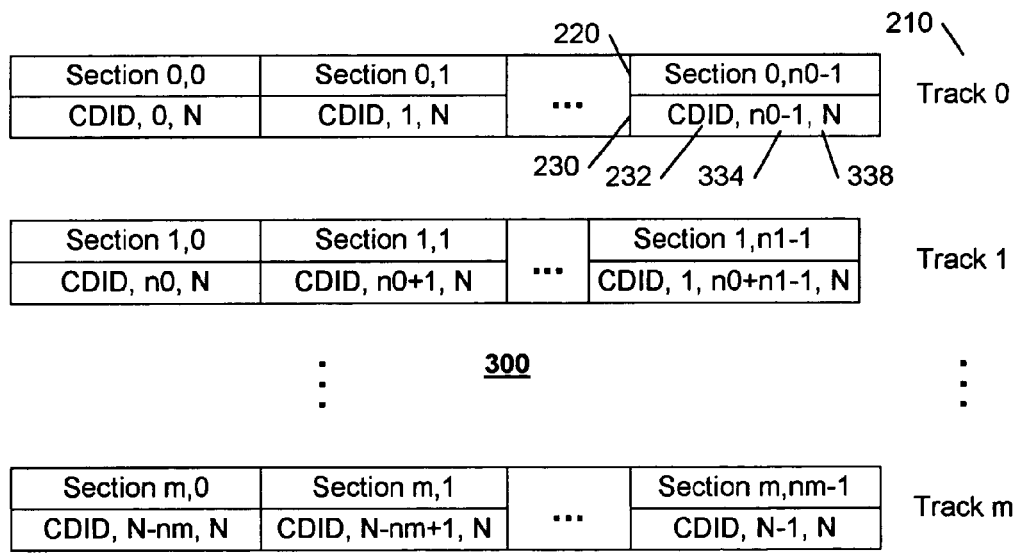
FIG. 3 illustrates an example alternative data structure that facilitates a determination of the presence of an entirety of a data set in accordance with this invention.

FIG. 2 illustrates an example data structure 200 for storing data items in a data set that facilitates a determination of whether the entirety of the original data set is present. A track T 210 and section S 220 structure is illustrated, consistent with the memory structure of conventional CD and other storage media. As illustrated, each track T 210 may have a different number of sections S 220. In the example data structure 200, each section contains ancillary information 230 that is used by a compliant rendering device to verify that the entirety of the data set is present. As discussed above, in accordance with this invention, the ancillary information 230 of each section S 220 contains a unique identifier of the section and a unique identifier of the data set. The unique identifier of the data set is illustrated as the CDID 232 parameter that is encoded with each section, as discussed above. The unique identifier of each section is illustrated as the track 234 and section 236 identifier of each section. FIG. 3 illustrates an alternative data structure 300, wherein the unique identifier 334 of each section 220 is a sequential numbering of each section 220, from 0 to N−1, where N 338 is the total number of sections in the data set. In this example data structure, the value of N 338 is included in the ancillary information 230, to facilitate an access to the sections ranging from 0 to N−1. Preferably, the ancillary information 230 containing these identifiers is encoded as a combination of robust and fragile watermarks that are embedded with each section 220.

Figure 4:
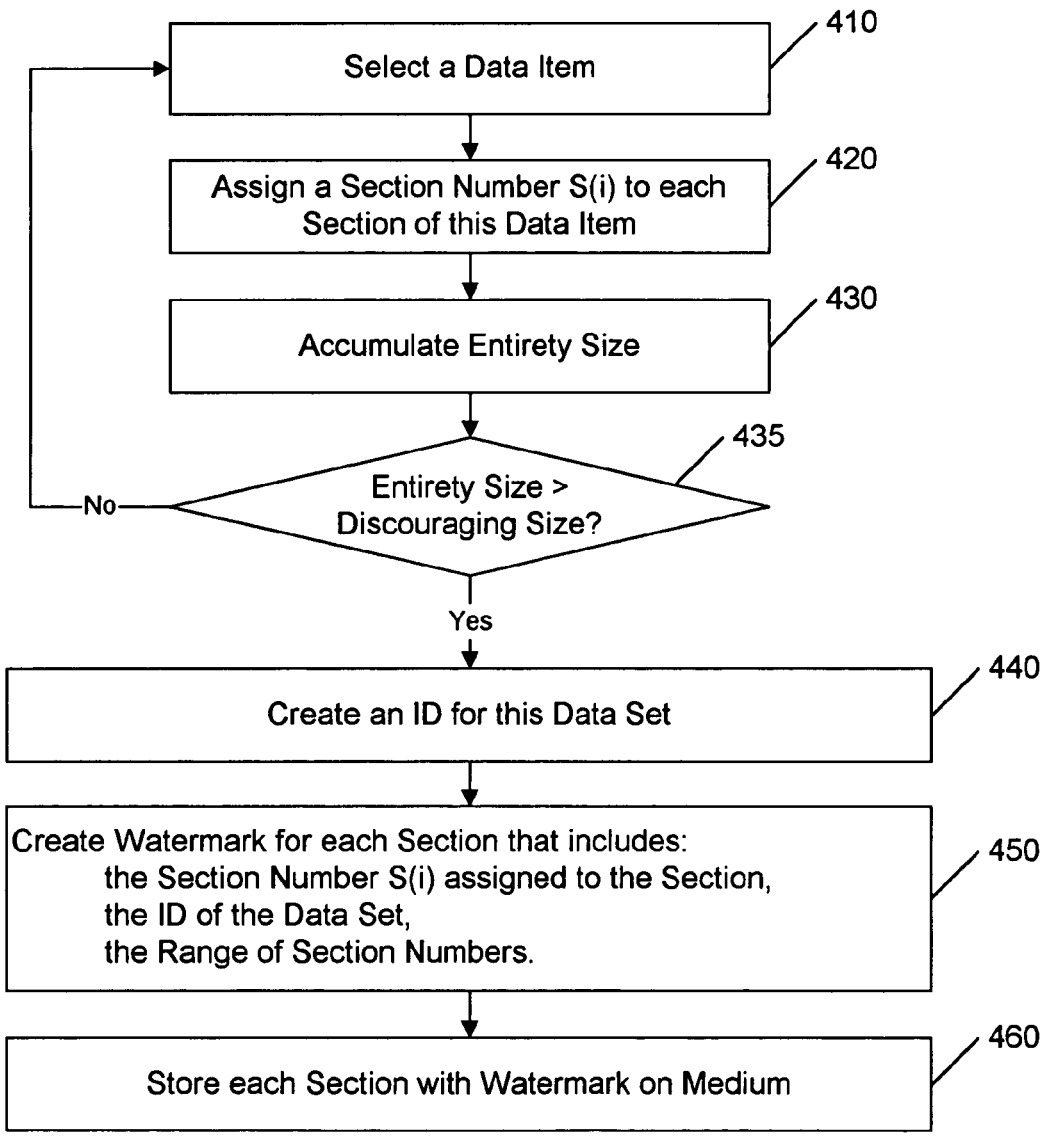
FIG. 4 illustrates an example flow diagram for creating a data set with security items that facilitate a determination of the presence of an entirety of the data set in accordance with this invention.

FIG. 4 illustrates an example flow diagram for creating the example data structure 300 of FIG. 3. The loop 410-435 accumulates data items to form a data set that is sufficient large so as to discourage a transmission of the data set via a limited bandwidth communications channel, such as a download from the Internet. As each data item is selected, at 410, each section comprising the data item is assigned a section number that is used to identify the section, at 420, and its size is added to the accumulated size of the data set, at 430. After accumulating a sufficiently sized data set, at 435, a somewhat-unique data set identifier is created, at 440, as discussed above. In a preferred embodiment, the section identifier and data set identifier are bound to each section using a security item, such as a watermark, a checksum parameter, an encrypted value, or other parameter or technique, common in the art, that facilitates a determination that each section contains the identifiers that were originally assigned to it. At 450 of the example flowchart, one or more watermarks are created for each section, comprising the section identifier, the data set identifier, and the range of available section numbers in this data set. Preferably, the section identifier corresponds to an incremental count of each section as it is added to the data set, so that the range value is merely the total number of section numbers in the data set. As noted above, a combination of robust and fragile watermarks are preferably used for encoding the information associated with each section. The section and its embedded watermark(s) are recorded onto the recording medium, such as a CD, at 460.

Figure 5:
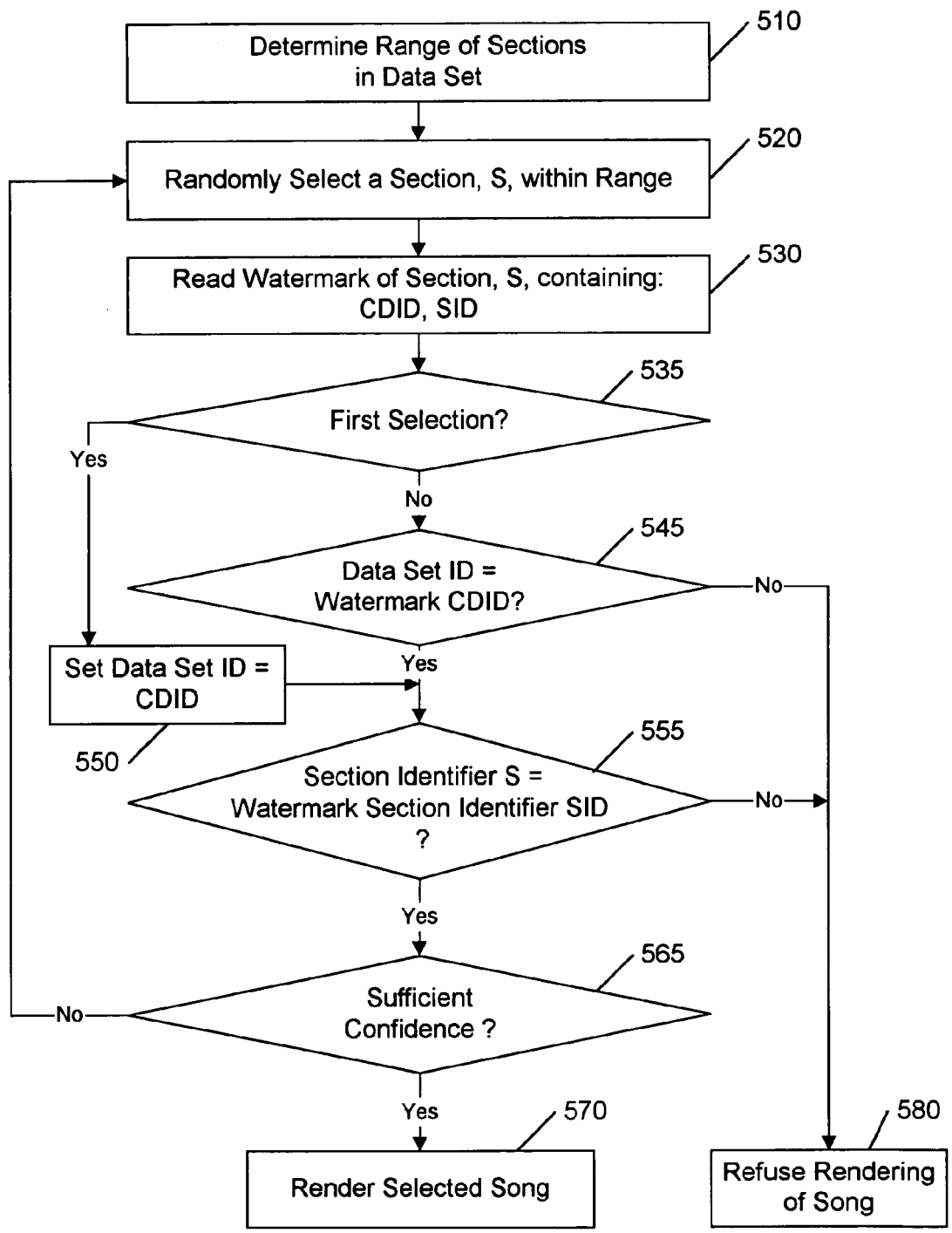
FIG. 5 illustrates an example flow diagram of a decoding system for rendering content material in dependence upon the presence of an entirety of a data set in accordance with this invention.

FIG. 5 illustrates an example flow diagram of the rendering of data items of a data set in dependence upon the presence of the entirety of the data set, using the example data structure 300 of FIG. 3 to determine the presence of the entirety of the data set. It is assumed that the rendering device has detected the presence of copy-protected material, via for example, the detection of a watermark or other marking of the material. At 510, the highest section number forming the range of 0 to N−1 sections is determined, and at 520, a random section within this range is selected. Preferably, the range is explicitly encoded in each section, as discussed above, although any of a variety of techniques can be used to determine the range of sections within the data set, or in other ways identify an access to sections of the data set. This access identifier, such as the range of the section identifiers, may be encoded within each section, within a table of contents of the disk, suitably protected from modification using, for example, watermarks. Alternatively, as discussed above, the CDID data set identifier may contain this access identifier for identifying the range of sections within the data set. In this embodiment, knowing that there is at least one section in any data set, the first section can be read to determine the data set ID and encoded range; alternatively a section from the data item selected for rendering can be used as an initial section for reading the data set ID and encoded range. Alternatively, if the minimum size of the data sets used in accordance with this invention is known, the range may be set as the minimum number of sections required to achieve the minimize sized data set. These and other techniques for determining a range of section numbers in a data set will be evident to one of ordinary skill in the art in view of this invention. At 530, the watermarks of the selected random section within the range of section numbers are read to provide the data set identifier CDID and the section identifier SID.

When, at 535, the watermark of the first selected section is read, its data set identifier CDID becomes, at 550, the data set identifier ID that is used to compare, at 545, each of the other CDIDs of sections purported to be from this same data set. At 555, the section identifier S that was used to access the selected section is compared to the section identifier SID that was read from the watermark of this accessed section S. If, at 555, the watermark section identifier SID does not correspond to the access section identifier S, this implies that the section numbers have been modified in some manner, and the subsequent processing of data from the data set is terminated, at 580. Subsequent randomly selected sections are similarly verified, via the loop 565-520, until sufficient confidence is gained that the entire data set is present. Each section's CDID is verified, at 545, by comparing it to the first CDID that was read, and each section's identifier SID is verified, at 555, by comparing to the section identifier S that was used to access the section. In this embodiment, absolute confidence can be gained by continuing the loop 520-565 until all sections within the range of the data set have been processed. The reading of each watermark, however, is time consuming, and a substantial delay before the rendering of a song may be unacceptable to consumers. In a preferred embodiment, the rendering of the song begins immediately after a few successful random section verifications. Thereafter, if the rendering system is able to read information from the medium faster than is required for rendering the material, additional section watermarks are read and verified, and the rendering is terminated if and when a mis-match between data set or section identifiers is found.

Also in a preferred embodiment, the determination that the entirety of the data set is present is deemed completed when the number of random sections tested provide sufficient confidence that the entirety of the data set is present, with substantial statistical certainty. That is, for example, if only half the data set is actually present, the random selection of any section is likely to detect an absence of the section 50% of the time. The likelihood of not detecting the absence of half the data set after k random section selections and verifications is $(\frac{1}{2})^k$. Each successive test increases either the confidence level or the expected proportion of the data set being present, or both. Statistical tests are commonly available for determining an appropriate number of section verifications to achieve a desired level of confidence that a given proportion of the data set is present. In a typical embodiment, the verification of at least five randomly selected pairs is considered sufficient to determine the presence or absence of the entirety of the data set.

In an alternative embodiment, the number of sections verified is proportional to the size of the selection being rendered, so that the resources required to effect the verification can be allocated appropriately. In a straightforward embodiment of this technique, as each section is presented for rendering, a verification of a random section is performed. If the rendering device is sufficiently fast, multiple random sections can be verified with each rendered section. By coupling the reading of random sections to the presentation of select sections for rendering, longer data items will be verified more completely than shorter data items. This alternative is particularly well suited for content material whose value is proportional to the size of the data item, or proportional to the rendering duration.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the examples presented above illustrate each part of the recorded material being part of the data set. In an alternative embodiment, select data items, or select parts of data items, may be used to form the data set, for efficiency purposes. For example, the tail end of songs may not be part of the "data set" as defined herein, because the watermark process may be based on a fixed block-size for each watermark, or each redundant copy of the watermark. If, for example, the watermark, or other parameter, requires ten seconds of a recording for a reliable embedding, the remainder of ((the song's length) modulo (10 seconds)) will be recorded on the medium, but not included in the "data set" whose entirety is being checked. In like manner, some promotional material may be included on the recorded medium, but purposely excluded from the data set, so that it may be freely copied and rendered elsewhere. Note also that the example flow diagrams are presented for ease of understanding, and the particular arrangement and sequence of steps are presented for illustration. For example, simple equalities are illustrated in the decision blocks for determining correspondence, whereas depending upon the particular techniques used to encode or decode the parameters, the assessment as to whether the read item corresponds to a determined item can include a variety of intermediate processes. These processes may include, for example, a decryption of items based on particular keys, fuzzy logic or statistical testing to determine if two values are "close enough" to imply a correspondence, and the like. Variations such as these and others will be evident to one of ordinary skill in the art in view of this invention, and are included in the spirit and scope of the following claims.

We claim:

1. A method of decoding content material from a source comprising:

reading a first data set identifier and a first section identifier associated with a first section of a data set, reading a second data set identifier and a second section identifier associated with a second section of the data set, and rendering subsequent sections of the data set if the first data set identifier matches the second data set identifier;

wherein a selecting unit is used to select the data set, the data set being composed of a plurality of desired data and a plurality of undesired data; and wherein the undesired data is added to the data set if it is determined that access to the data set is not permitted by a user deemed to have unauthorized status and undesired data is not added to the data set if it is determined that access is permitted by the user deemed to have authorized status.

2. The method of claim 1, wherein rendering subsequent sections of the data set is in further dependence upon a correspondence between the second section identifier and a section address associated with the second section of the data set.

3. The method of claim 1, wherein at least one of the first section and the second section is selected for reading based on a random selection process.

4. The method of claim 1, wherein the first section corresponds to a section of a data item that is selected for rendering, and the second section is selected for reading based on a random selection process that is dependent upon a receipt of the first section.

5. The method of claim 1, further including reading subsequent data set identifiers and section identifiers associated with other sections of the data set, wherein the rendering of subsequent sections of the data set is in further dependence upon a correspondence between the first data set identifier and the subsequent data set identifiers.

6. The method of claim 1, wherein the content material includes at least one of: digitally encoded audio content, and digitally encoded video content.

7. A storage medium that is configured to contain content material, the storage medium comprising:

a data structure that includes:

a plurality of sections, each section of the plurality of sections having at least one security item that associates the section to a data set, wherein the at least one security item includes a data set identifier and a self-referencing section identifier that facilitate a determination of whether an entirety of the data set is present on the storage medium and precludes rendition if a first data set identifier of a first section of the data set does not match a second data set identifier of a second section of the data set;

wherein a selecting unit is used to select the data set, the data set being composed of a plurality of desired data and a plurality of undesired data; and wherein the undesired data is added to the data set if it is determined that access to the data set is not permitted by a user deemed to have unauthorized status and undesired data is not added to the data set if it is determined that access is permitted by the user deemed to have authorized status.

8. The storage medium of claim 7, wherein the at least one security item includes at least one watermark that is embedded within each section.

9. The storage medium of claim 8, wherein the at least one watermark includes:

a fragile watermark that is configured such that a modification of the section causes damage to the fragile watermark, and a robust watermark that is configured such that a removal of the robust watermark from the storage medium causes damage to data contained in the corresponding section.

10. The storage medium of claim 7, wherein the at least one embedded security item includes an access identifier that facilitates a determination of an accessible range of sections within the data set.

11. The storage medium of claim 7, wherein the plurality of sections includes a plurality of at least one of: digitally encoded audio content, and digitally encoded video content.

12. A decoder comprising:

a renderer that is configured to receive a plurality of data items corresponding to a data set, and to produce therefrom a rendering corresponding to a select data item, each data item of the plurality of data items including one or more sections, thereby forming a plurality of sections comprising the data set, each section of the plurality of sections including a section identifier corresponding to the section and a data set identifier, and an entirety checker, operably coupled to the renderer, that is configured to preclude the rendering corresponding to the select data item if data set identifiers of two or more sections of the plurality of sections do not match, wherein a selecting unit is used to select the data set, the data set being composed of a plurality of desired data and a plurality of undesired data; and wherein the undesired data is added to the data set if it is determined that access to the data set is not permitted by a user deemed to have unauthorized status and undesired data is not added to the data set if it is determined that access is permitted by the user deemed to have authorized status.

13. The decoder of claim 12, wherein each of the two or more sections of the plurality of sections are selected based on two or more section addresses, and the entirety checker is configured to preclude the rendering in dependence upon a correspondence between the two or more section addresses and the corresponding section identifiers of the two or more sections.

14. The decoder of claim 12, wherein
at least one of the two or more section addresses is selected based on a random selection process.

15. The decoder of claim 14, wherein
at least one of the two or more section addresses corresponds to a section address of a data item selected for rendering, and
the random selection process is synchronized with a retrieval of data corresponding to each section address of the data item selected for rendering.

16. The decoder of claim 12, wherein
the renderer is further configured to receive an access identifier that is associated with at least one section, to facilitate a determination of an accessible range of sections within the data set.

17. The decoder of claim 12, wherein the data items correspond to at least one of: digitally encoded audio content, and digitally encoded video content.

* * * * *